United States Patent
Cornett et al.

(10) Patent No.: US 6,798,174 B2
(45) Date of Patent: Sep. 28, 2004

(54) METHOD OF TERMINATING CHARGE FOR A BATTERY

(75) Inventors: James Cornett, Dacula, GA (US);
Charles Byrne, Lawrenceville, GA (US); David Demuro, Snellville, GA (US)

(73) Assignee: Motorola, Inc., Schaumburg, IL (US)

( * ) Notice: Subject to any disclaimer, the term of this patent is extended or adjusted under 35 U.S.C. 154(b) by 23 days.

(21) Appl. No.: 10/355,513

(22) Filed: Jan. 31, 2003

(65) Prior Publication Data

US 2004/0150367 A1 Aug. 5, 2004

(51) Int. Cl.[7] .................................................. H02J 7/16
(52) U.S. Cl. ........................................................ 320/155
(58) Field of Search ................................ 320/155, 133, 320/148, 157, 159

(56) References Cited

U.S. PATENT DOCUMENTS

| 5,694,023 A | 12/1997 | Podrazhansky et al. ...... 320/129 |
| 6,154,011 A | 11/2000 | Lam et al. .................. 320/139 |
| 6,683,440 B2 * | 1/2004 | Kawakami et al. ......... 320/133 |

* cited by examiner

*Primary Examiner*—Pia Tibbits
(74) *Attorney, Agent, or Firm*—Philip H. Burrus, IV

(57) ABSTRACT

This method of charging includes a method of terminating charge when three events have occurred: a voltage across at least one of the cells reaches a predetermined maximum voltage, the average charging current falls below a predetermined minimum current, and the presence of a power source has been detected. The method also includes a safety termination that prohibits charge upon the expiration of a timer when the cells have stored little or no energy.

4 Claims, 2 Drawing Sheets

METHOD OF TERMINATING CHARGE FOR A BATTERY

BACKGROUND

1. Technical Field

This invention relates generally to methods of charging rechargeable battery cells, and more specifically to a method for terminating the charging cycle associated with a battery cell or cells.

2. Background Art

Rechargeable battery packs are commonly used in portable electronic devices like cellular phones, radios and portable computers. Such battery packs generally contain one or more rechargeable cells in addition to electronic circuitry and mechanical components. Lithium-ion is the chemistry of choice for rechargeable cells in most electronics applications due to its light weight and high energy density.

Lithium batteries must be properly charged to ensure reliable performance. For example, a single lithium cell can generally only be charged until the cell voltage reaches 4.1 or 4.2 volts. Charging the cell beyond this point can result in combustible gasses being generated within the cell, which may compromise operational reliability.

Prior art charging systems generally terminated charge current based upon voltage alone. In other words, these prior art charging systems applied a current to the cells until they reached their termination voltage. Once the termination voltage was reached, the charging system would turn off the charging current.

The problem with these voltage-terminating systems involves ionic relaxation. Briefly, when a current is applied to or pulled from a cell, the active particles that exchange chemical and electrical energy become agitated and bump into each other. When the applied current is removed, the ions begin to return to a state of rest. The resting process is referred to as "ionic relaxation". Typically, the time required for relaxation under a normal stimulus is somewhere between 30 and 300 seconds.

Ionic relaxation impacts a cell when charging. When a cell is being charged at a high rate, the voltage across the cell increases as the cell absorbs energy. If the charge current is suddenly interrupted, the cell voltage drops a certain amount almost instantly due to the equivalent series impedance of the cell. Following the initial drop, the cell voltage will continue to drop exponentially until a lower steady state voltage is reached. This exponential decay is a result of ionic relaxation. In a similar fashion, when charge current is applied to the cell, the voltage instantaneously increases due to the equivalent series resistance. This initial jump is followed by an exponential increase in voltage due to ionic agitation.

Charging a battery is similar to, and thus may be visualized as, filling a mug with creamy, frothy root beer. Imagine that the mug is the battery, root beer is energy, and the foamy head is an undesirable increase in cell voltage and impedance caused by inefficient agitation. The goal is to fill the glass with root beer as quickly as possible, i.e. fast "charging", without any of the foamy head overflowing the mug. Pouring in one continuous stream is the same as charging a battery with a constant current; it generates a substantial amount of head. If, however, one puts in a little root beer and waits for the head to disappear (i.e. allow ionic relaxation to take place), then puts in another burst and so on, the glass can be filled (or battery can be charged) much more quickly.

The problem with voltage-terminating charging systems is that they terminate current when the cell voltage reaches its maximum. Once ionic relaxation occurs, the voltage drops. Thus, while the charger thinks the cell has been fully charged, in reality it may have only been charged to 80% of its capacity. This is analogous to turning off the root beer tap when the frothy head reaches the top of the glass. Once the head subsides, you find that you only have half a glass of root beer.

There is thus a need for an improved charge termination method.

DETAILED DESCRIPTION OF THE INVENTION

Figure 1:
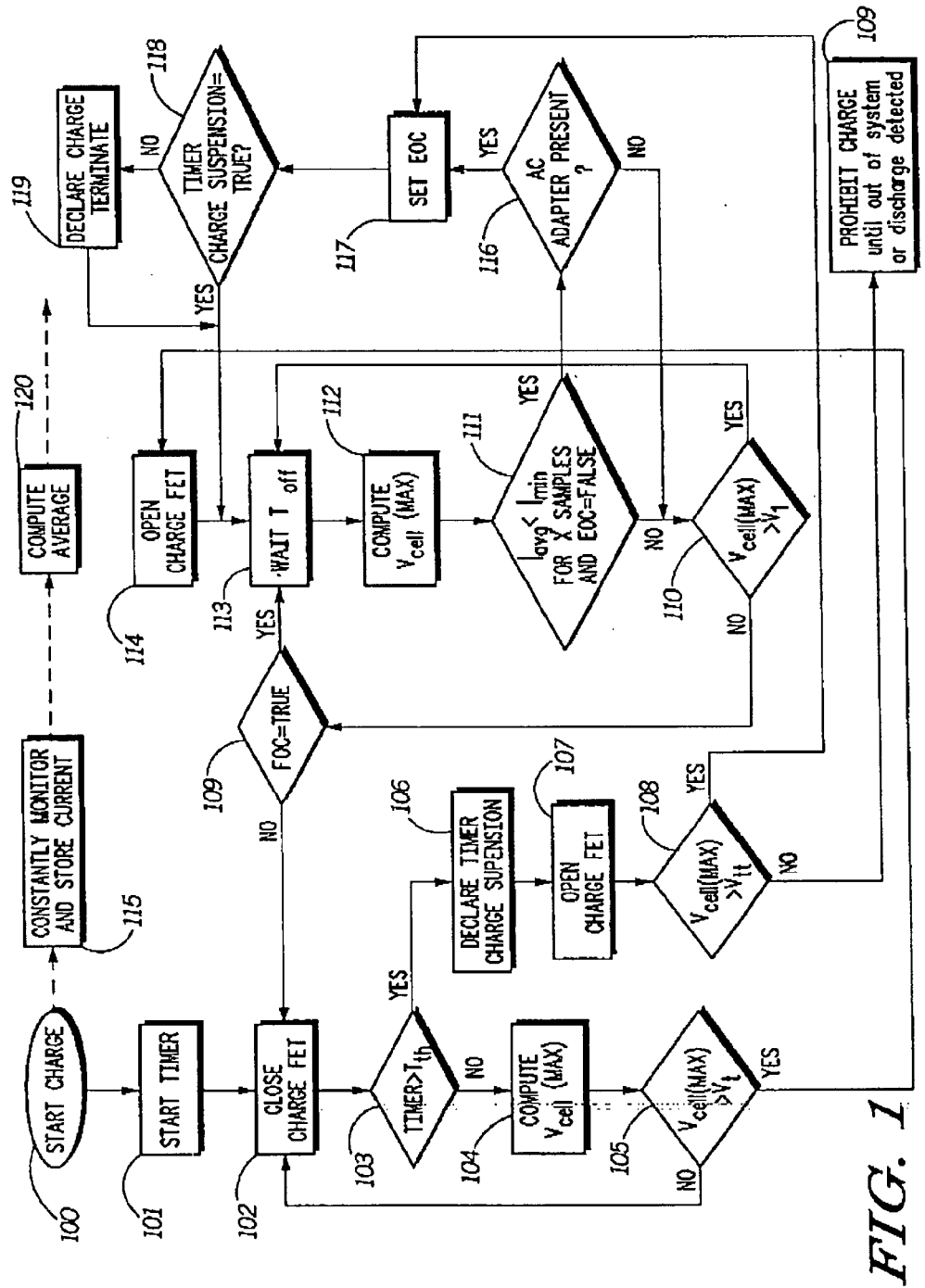
FIG. 1 illustrates a flow chart for a method of charging in accordance with the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

This invention includes a method of terminating charge based upon average current. The system checks to see whether a power supply is present, and whether the cells have reached a predetermined termination voltage. If they have, the method terminates charging provided that the average current that has been charging the cell or cells has fallen below a predetermined threshold. The invention also includes a timer as a safety measure that terminates charge when the cell has not absorbed any energy during the running of the timer.

Referring now to FIG. 1, illustrated therein is a flow chart for a method of charging in accordance with the invention. Upon commencement of charging at step 100, a timer is initiated and started at step 101. With the timer running, a serial element capable of passing and stopping charging current, like a transistor for example, is closed at step 102 to allow current to flow from a power source to the rechargeable cells. Whenever current is flowing through the serial element, the amount of current is constantly being sensed and stored, as shown in background step 115.

While the charge current is flowing, the maximum cell voltage is measured at step 104. This voltage is the largest voltage across any one cell, selected from the group of voltages across the individual cells. If the battery pack includes only one cell for example, this voltage would just be the voltage across that cell. If, however, there are four cells in series, this voltage would be the largest voltage selected from the group of the voltages across the four individual cells. In other words, if the voltages across the cells were 3.6, 3.7, 3.8 and 3.7 volts, this voltage would be 3.8 volts. So long as this maximum cell voltage is below a predetermined maximum threshold (step 105), charging continues.

Once the maximum cell voltage exceeds the predetermined maximum threshold, the serial element is opened at step 114, thereby interrupting the charge current. The serial element is held open for a predetermined wait time at step 113. The predetermined wait time allows for ionic relaxation to occur. Once the wait time has expired, the maximum cell voltage is again measured at step 112.

The method then looks at the average current at step 111 to determine if it has fallen below a minimum current threshold. The average current is an average of a predetermined number of current samples that have been measured during a corresponding number of applied charging currents. To explain, consider the following: The serial element will be closed (step 102) and opened (step 114) several times during any given charging cycle. This is due to the ionic agitation and relaxation that occurs during charging. By way of example, in a single cell application, a charge current may be applied until the cell reaches 4.1 volts. Once the serial element opens, after the wait time, the cell may drop to 3.8 volts due to ionic relaxation. The serial element will be closed again until it reaches 4.1 volts, and then opened again, and so on. As the cell becomes more fully charged, the internal impedance of the cell increases, thereby reducing the charging current. The charging circuitry associated with the battery pack (shown in FIG. 2) records the magnitude of current for each of these "serial element close and open cycles" (by way of step 115) and keeps a running average (by way of step 120) of these currents. When this rolling average falls below a minimum current threshold (step 111), the charging circuitry presumes that it is due to the increased impedance of the cell caused by increased energy storage. Thus, step 111 determines that the cells are fully charged by determining when the average of a number of samples of current falls below the minimum current threshold.

If the average current has fallen below the minimum current threshold, which is on the order of 100 mA for a single, serial set of cells, the method checks to see whether a power source is present at step 116. This is important due to loading of the battery pack. Imagine that the load coupled to the battery is a laptop computer. A user is charging the laptop and it reaches full charge (by way of the average current falling below the minimum current threshold). It the user immediately disconnects the power source, all that will be left coupled to the battery is the load. There is no need to terminate charging if no power source is coupled to the battery. For this reason, the method checks to see whether a power source is coupled (step 116) prior to declaring "end of charge" (EOC) at step 117. Thus, to terminate charge in the normal mode of the method, three things must occur: there must be a voltage maximum reached at step 105; the average current must have fallen below a threshold at step 111, and a power source must be coupled to the battery at step 116.

The method includes an alternative means of terminating charge as a safety feature. Occasionally a user might try to charge a defective battery. The defect may be simply an open circuit within the battery pack, or it may be severe physical damage to the cell. In either event, the method includes a means of terminating charge where the cell does not store energy.

Referring again to FIG. 1, recall that when charging begins, a timer is started at step 101. The serial element is then closed at step 102. So long as the maximum voltage across any one cell is below the maximum voltage threshold, the serial element will remain closed, thereby applying current to the cell, by way of step 105 flowing back to step 102. If this occurs for a long period of time, it means that the cell is not storing energy, which is indicative of a problem with the cell.

The timer prevents such a loop from running indefinitely, potentially compromising reliability of the host device. If the timer expires at step 103 prior to the maximum voltage exceeding the predetermined voltage threshold at 105, the method records an error flag at step 106 by declaring a timer charging suspension. The serial element is then opened at step 107. The maximum voltage is checked again at step 108 to ensure that no energy has been stored in the cells. If this is the case, the method prohibits charging of any kind at step 109, thereby protecting the host device. Thus, to terminate charge in the safety mode of the method, two things must occur: the timer must expire at step 103 and the maximum cell voltage must be below a predetermined threshold at step 108.

Figure 2:
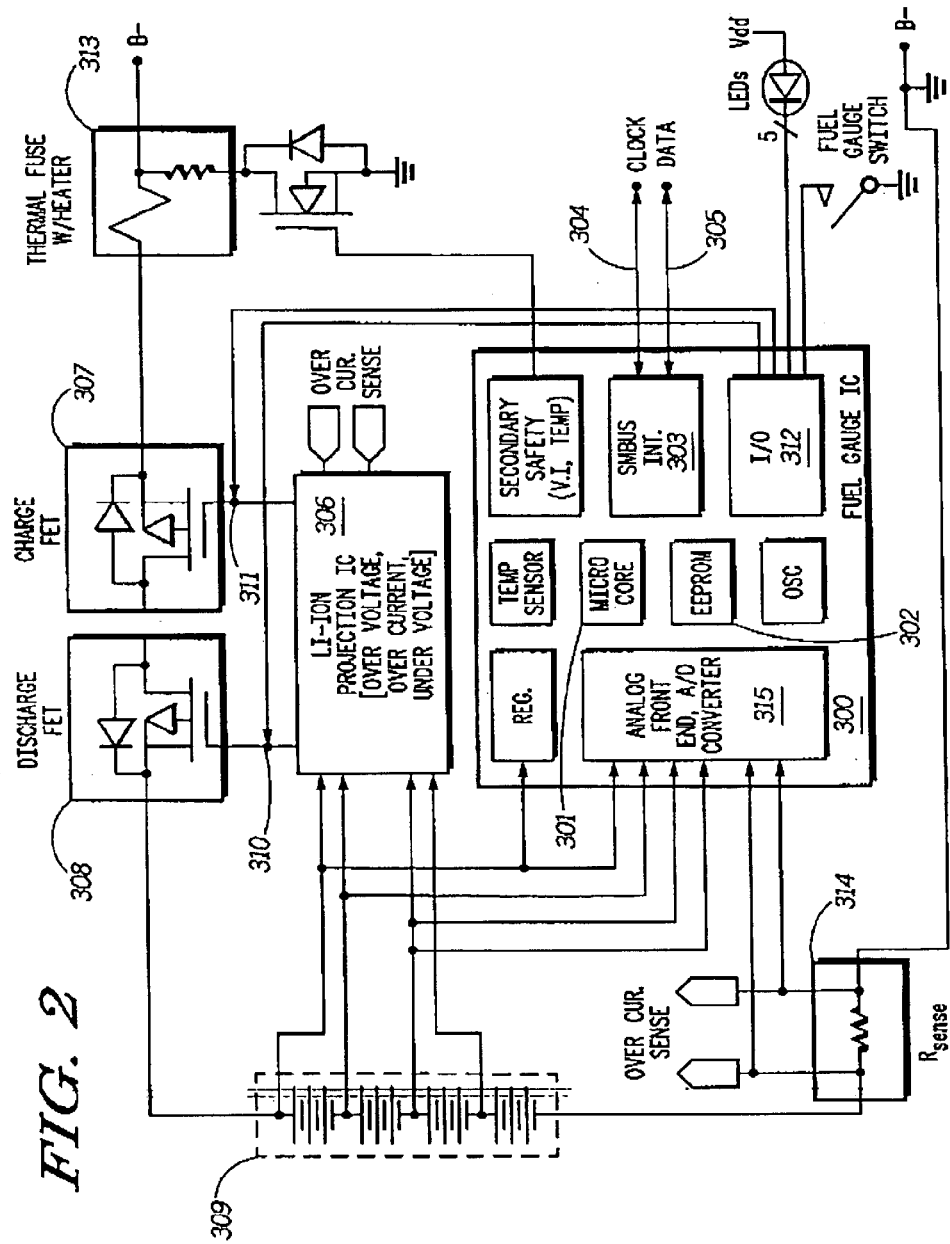
FIG. 2 illustrates a preferred embodiment of a battery pack in accordance with the invention.

Referring now to FIG. 2, illustrated therein is one preferred embodiment of a battery pack in accordance with the invention. The circuit optionally includes a fuel gauging IC 300 (hereinafter "fuel gauge"). Such ICs are currently available on the market. Examples include the PS401 manufactured by PowerSmart, and the M37516 manufactured by Mitsubishi. The fuel gauge 300 includes a microprocessor core 301 that is responsible for running executable code stored in the EEPROM 302. Executable code is loaded into the EEPROM 302 via a standard data interface represented here as the SMBus interface 303. Essentially, data is clocked in on a data line 305 in synch with a clock line 304, using the industry standard SMBus protocol. Once stored in the EEPROM 302, the code becomes embedded firmware for execution by the microprocessor core 301.

A charge protection circuit 306 controls a charge 307 and discharge 308 transistor. An example of such a charge protection circuit is the MM1414 manufactured by Mitsumi. Here, the charge protection circuit 306 is shown regulating four cells 309 coupled in series, but it will be clear that this is for exemplary purposes only. The invention is easily applied to any number and arrangement of cells, depending upon the battery pack application.

The fuel gauge 300 alternately controls the charge 307 and discharge 308 transistors by way of digital "OR" connections 310,311 coupled to an I/O port 312 on the circuit. A current sense resistor 314 coupled to the on-board A/D converter 315 provides current sensing and additional overcurrent protection.

During normal charging operation, the charge protection circuit 306 operates in parallel with the method of FIG. 1, thereby providing another layer of safety. The charge protection circuit 306 normally keeps the charge 307 and discharge 308 transistors closed, thereby allowing current to flow from the power supply (not shown) to the cells 309. The charge protection circuit 306 only opens when either an overvoltage situation occurs (the voltage across any one cell exceeds the manufacturer's limit) or an undervoltage condition occurs (the voltage across any one cell falls below a minimum operating threshold), or excessive discharge or charge current is detected. The microprocessor core 301 is then able to execute the method of FIG. 1 in parallel to the charge protection circuit 306 by way of the digital OR connections 310,311.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims.

What is claimed is:

1. A method for charging a battery pack, the method comprising the steps of:

a. applying a charge current until a voltage across at least one rechargeable cell reaches a predetermined maximum voltage threshold;

b. measuring and storing the magnitude of the applied charging current;
c. discontinuing the charging current;
d. waiting a predetermined time;
e. repeating at least once:
   i. the applying of a charging current until the voltage across the at least one rechargeable cell reaches a predetermined maximum voltage threshold;
   ii. the measuring and storing of the magnitude of the applied charging current;
   iii. the discontinuing of the charging current,
   iv. and the waiting a predetermined time;
f. calculating an average of a predetermined number of the stored magnitudes of the applied charging current;
g. sensing for the presence of a power source; and
h. terminating charging when both the average of a predetermined number of the stored magnitudes of the applied charging current falls below a predetermined current threshold, and the power source is present.

2. The method of claim 1, further comprising the steps of initiating and actuating a timer prior to the first application of charging current.

3. The method of claim 2, further comprising the step of discontinuing charging current upon expiration of the timer prior to the voltage across the at least one rechargeable cell reaching the predetermined maximum voltage threshold.

4. The method of claim 3, further comprising the step of terminating charging upon both the expiration of the timer and the voltage across the at least one cell not reaching a second predetermined voltage threshold.

* * * * *